United States Patent [19]

Hartery

[11] 4,123,817

[45] Nov. 7, 1978

[54] WIPER BLADE AND SYSTEM

[76] Inventor: William J. Hartery, 12 Cary Ave., Lexington, Mass. 02173

[21] Appl. No.: 822,535

[22] Filed: Aug. 8, 1977

[51] Int. Cl.² .............................................. B60S 1/46
[52] U.S. Cl. .............................. 15/250.04; 15/250.36
[58] Field of Search .................... 15/250.01–250.04, 15/250.36–250.42

[56] References Cited

U.S. PATENT DOCUMENTS

| | | | |
|---|---|---|---|
| 2,051,668 | 8/1936 | Zaiger | 15/250.4 |
| 2,583,710 | 1/1952 | Scinta | 15/250.36 |
| 2,757,615 | 8/1956 | Bolles et al. | 239/284 X |
| 2,901,761 | 9/1959 | Wallis | 15/250.42 |
| 2,926,375 | 3/1960 | Flynn | 15/250.36 |
| 3,304,569 | 2/1967 | Christensen | 15/250.04 |
| 3,545,028 | 12/1970 | Poland | 15/250.36 |
| 3,636,583 | 1/1972 | Rosen | 15/250.36 |
| 3,969,783 | 7/1976 | Shipman | 15/250.04 |

FOREIGN PATENT DOCUMENTS 583,367 9/1933 Fed. Rep. of Germany ........ 15/250.41
2,004,370 8/1971 Fed. Rep. of Germany ........... 239/284

Primary Examiner—Peter Feldman
Attorney, Agent, or Firm—Lowell H. McCarter

[57] ABSTRACT

The present invention relates to a windshield cleaning system and more particularly to a windshield cleaning system which utilizes both an oscillating wiper blade and a washer fluid system for transporting the washer fluid through the blade to outlets in the upper portion of the blade to clean the outer surface of the windshield.

The windshield wiper blade includes a hollow elongated elastic material body enveloping a flexible elongated spline member. The body and the spline member cooperatively form elongated liquid passageways in the body. A flexible contact member extends downwardly from the elastic body to contact the windshield.

8 Claims, 6 Drawing Figures

U.S. Patent
Nov. 7, 1978
4,123,817
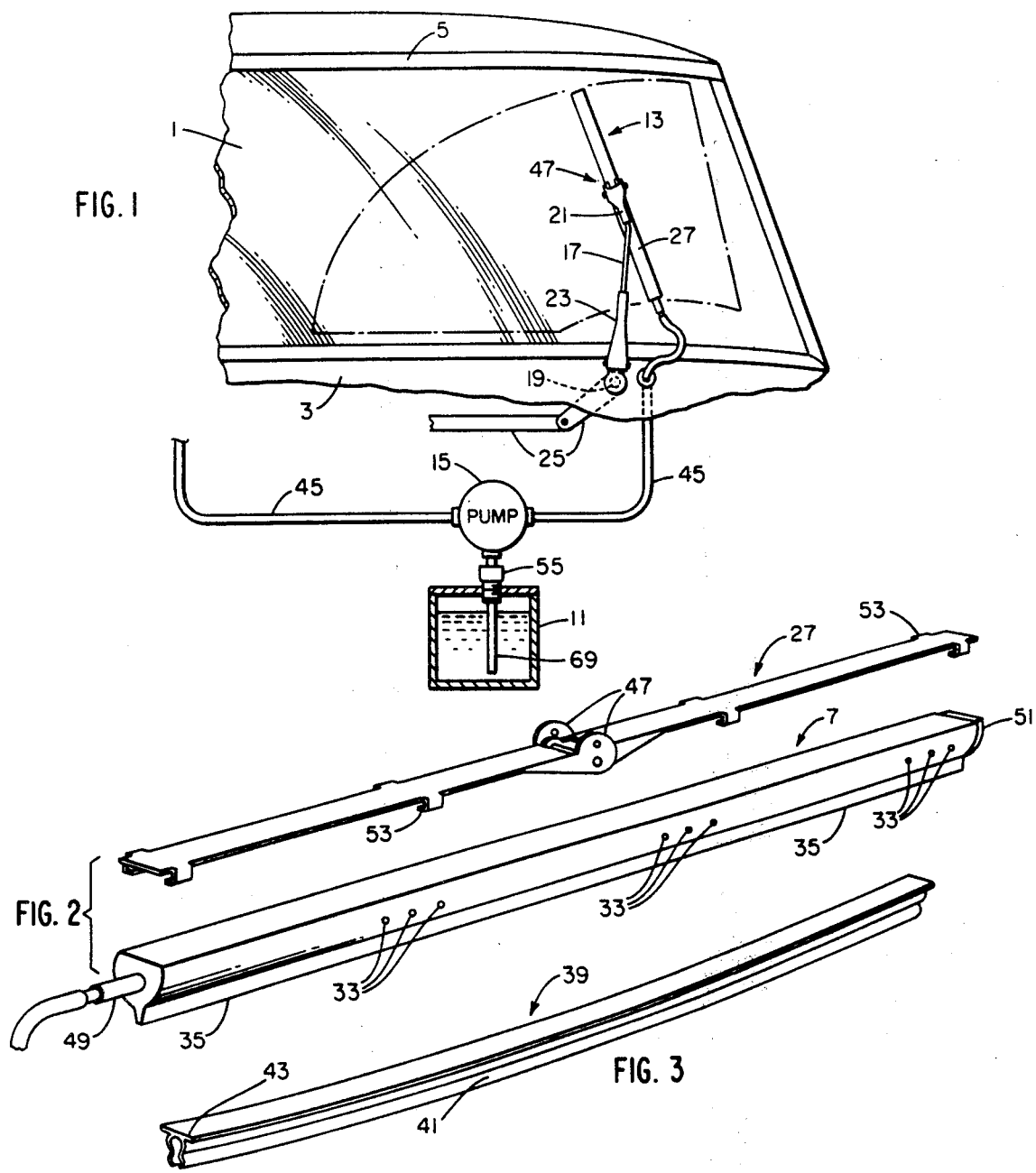
FIG. 1
FIG. 2
FIG. 3
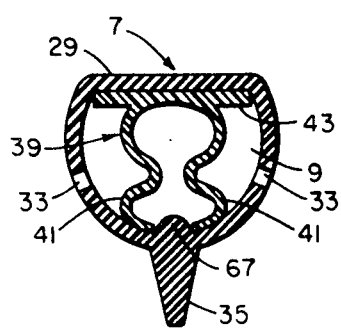
FIG. 4
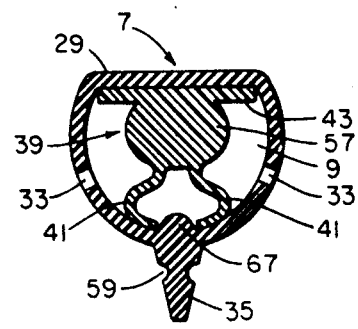
FIG. 5
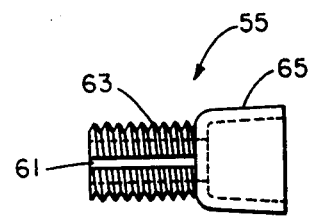
FIG. 6

WIPER BLADE AND SYSTEM

Windshield cleaning systems commonly comprise a wiper unit with a flexible wiper blade which is moved across the outer surface of a windshield and a washer unit which discharges a spray of washer fluid onto the outer surface of the windshield and into the path of the moving wiper blade. The washer unit includes a reservoir containing a supply of washer fluid.

The windshield cleaning system and wiper blade according to the preferred embodiment of the present invention provides a flow of washer fluid from the reservoir of washer fluid through the wiper blade and directly onto the surface where the washer fluid is required. The wiper blade is moved in a conventional oscillatory manner across the outer surface of the windshield and has a passage therethrough in communication with the outer surface of the windshield which provides for the circulation of washer fluid through the wiper blade against the outer surface The wiper blade which is flexible or resilient has a contact member which engages the outer surface of the windshield for wiping the same during the oscillating movement of the wiper blade thereacross and for substantially depositing the washer fluid immediately ahead of the blade's oscillating motion. The system may additionally include if desired, an economizer bushing, a filter for filtering foreign material from the washing fluid and a relief valve for releasing any air which may have entered or built up in the system. A heater may be incorporated into the system to heat the washer fluid in the reservoir prior to circulation to the windshield surface. The outer surface of the windshield is cleaned by the blade contact and flow of washer fluid on the outer surface and the oscillating wiping movement of the wiper blade which is in engagement with the outer surface.

The background art considered in the preparation of this patent application includes the following U.S. Patents: Nos. 2,173,021; 2,562,819; 3,103,686; 3,418,676; 3,616,485; 3,716,886; 3,881,212; and 3,969,783.

The present invention provides a new and improved windshield wiper blade in a windshield cleaning system wherein washer fluid flows through a passageway in an oscillatable, flexible wiper blade whereby the washer fluid is deposited on the outer surface of the windshield directly ahead of the moving wiper blade.

The present invention further provides a new and improved windshield wiper blade that is solely contained within itself providing a fluid passageway and means for attachment to any of the several conventional wiper blade holders now on the replacement market. The wholly contained wiper blade will be much less susceptible to freeze-up during icy and cold weather.

In respect to the broad replacement market for windshield wiper blades, it should be noted that my new wiper blade will be accepted by any of the many conventional blade holders on the market. Thus the ease of substitution and the universality of acceptance by all conventional blade holders is easily recognized.

The invention will become more fully apparent from the following descriptions and drawings wherein:

FIG. 1 schematically shows a preferred embodiment of the windshield cleaning system of the present invention;

FIG. 2 is a perspective view of the wiper blade of the windshield cleaning system of the present invention in an exploded position with a conventional wiper blade holder;

FIG. 3 is a perspective view of the internal spline of the wiper blade;

FIG. 4 shows a crosssection of the wiper blade.

FIG. 5 illustrates an alternate spline for the wiper blade.

FIG. 6 is an illustration of an economizer bushing.

As representing the preferred embodiment of the present invention, FIG. 1 shows a windshield cleaning system for cleaning the outer surface of a windshield 1 of an automotive vehicle. The windshield 1 is supported by a suitable body structure 3 and is surrounded by a reveal molding 5.

The windshield cleaning system broadly comprises an oscillatory windshield wiper 13 having a passage 9 therethrough which is in communication with the windshield 1 and through which washer fluid will be pumped; a reservoir 11 containing a supply of washer fluid; a pump 15 for pumping the washer fluid through a conduit 69 from the reservoir 11 through the wiper blade 7. An economizer bushing 55 may be placed between the pump 15 and the conduit 6 from the reservoir 11. The windshield 1 is cleaned by the wiping action of the oscillating wiper blade 7 and by the washing fluid which contacts the windshield 1 as it is pumped through the apertures 33 in the wiper blade 7.

Referring to FIG. 1-4, the wiper 13 includes a conventional wiper arm 17 which is secured at its lower end through a drive pilot 19 which is rotatably supported adjacent the lower edge of the windshield 1 by the body structure 3 of the vehicle. The wiper arm 17 has spring hinged connected upper and lower sections 21 and 23 for biasing the wiper blade 7 along its entire length into engagement with the windshield 1.

The wiper arm 17 is oscillated about the drive pivot 19 by a suitable or conventional drive mechanism which includes a linkage means 25 and a wiper motor, not shown. The wiper arm 17 at its upper end shows a conventional wiper blade holder 27 for supporting the wiper blade 7. The blade unit 7 is detachably connected to the usual claws or clips 53 on the wiper blade holder 17. The wiper blade holder is detachably connected by means of conventional fastening means 47 to the wiper arm 17.

The wiper blade 7 is made from a suitable flexible or elastic material, preferably rubber, and may have a generally rectangular shape upper portion 29. The wiper blade 7 comprises a hollow elongated, flexible elastic material body with a flexible windshield contact member 35 downwardly extending from the body 7. A flexible elongated spline member 39 is internal to and partially filling a passageway 9 in the hollow, elongated elastic material body 7. An internal bead-like member 67 adjacent to the external contact member 35 projects upwardly in the passageway 9 in the body. The internal bead 67 functions as an alignment guide during assembly. In operation the internal bead 67 prevents the deflection and displacement of the relative desired spatial relationship between the spline 39 and the elastic member wiper blade 7 that friction would cause during the oscillatory motion. Apertures or openings 33 are provided in the wiper blade 7 along the upper portion thereof. It will be recognized that simply by inserting the spline 39 in the passageway 9 that fluid channels are formed in the wiper blade 7. The spline 39 is so designed that elastic material cannot collapse or partially collapse whereby the fluid flow might be restricted.

In another embodiment the wiper blade 7 may be manufactured from a porous elastomeric material. For example, a polyurethane foamed elastomeric material of approximately 60 Shore A hardness having a controlled fluid permeability may be manufactured by use of a foaming agent during the extrusion process. This eliminates the need for a separate perforating step in the blade manufacturing process.

The spline member 39 preferably has an elongated, generally rectangular upper member 43 adapted to accept claws or clips 53 associated with conventional windshield wiper blade holder 17. Extending from the splines rectangular upper member are one or more flexible arm members 41 in engaging contact with the lower portion of the passageway in the wiper blade 7. In the preferred embodiment, the pair of flexible arm members 41 as shown in FIG. 4, extend downwardly from the rectangular upper member and engage the inner side of the wiper blade passageway adjacent to the windshield contact member 35. It has been found that the downwardly extending flexible arm members may be of different configurations without affecting the effectiveness of the wiper blade 7 or the windshield contact member 35. A preferable configuration for the downwardly extending flexible arm member is of a generally corrugated configuration such as that shown in FIG. 4. The downwardly extending flexible arm member or members are of a configuration such that they do not block the flow of washer fluid through the passageway 9 or block the apertures 33 in the upper portion of the wiper blade 7. The arm members are designed to prevent the elastic material from collapsing upon itself and thus restricting fluid flow.

Preferably, the spline member 39 has a uniform radius of curvature resulting in an upward bow of at least about three-eighth inch per foot of spline member length. The uniform radius of curvature may provide for an upward bow as great as five-eighths inch or more per foot of spline member length where greater biasing potential is required. The hollow elongated flexible elastic material body of the wiper blade 7 is preferably of a thickness of about 3/64 inch or less depending upon the degree of flexibility desired.

In FIG. 5, an alternate spline member 39 is shown in association with the hollow, elongated elastic material body 7. Like numbers designate like members in FIG. 4 and FIG. 5. In FIG. 5, spline member 39 the rectangular upper member 43 has integral thereto a solid bead-like member 57 from which flexible arm members 41 extend downwardly. The solid elongated bead 57 will provide additional rigidity to the spline member 39 when required for certain applications. In either the FIG. 4 or FIG. 5 embodiments the uniform radius of curvature will provide for a range of upward bow flexure of at least about three-eighths inch up to five-eighths inch or more per foot of spline length.

In actual practice, the width of the upper rectangular member of the spline will be about one-fourth inch in width with a thickness between about 0.02–0.03 inches. The material of construction of the spline member will dictate the thickness and the configuration of the downwardly extending flexible arm members. I have found that when a polycarbonate resin is used, that the preferable thickness of the arm members is between 0.010 and 0.020 inches.

The wiper blade member can be conveniently extruded from well-known flexible and resilient materials of known compositions into a continuous length element. The element is then cut or chopped to desired length. The polycarbonate spline member may also be continuously extruded provided that the bow flexure required is engineered into the extruding technology. The spline member is then cut to the required length and inserted into the hollow elongated, elastic material body. The spline 39 is inserted in the body with the internal bead 67 providing a guide for insertion such that the downwardly extending arm members 41 straddle the internal bead 67. Thereby providing support in forming multiple passageways in the wiper blade. Of course, the apertures in the wiping blade are provided by conventional manufacturing techniques. Once the spline is assembled interior of the elongated, elastic material body, one end of the wiper blade is provided with a cap or a plug 51 which may be fastened in place by a sealing compound or by means of controlled heating. At the end opposite of the plugged end, a tubular member 49 to provide a fluid passageway from the fluid reservoir to the wiper blade passageway is fastened with a sealing compound or controlled heating.

Conventional fluid pumping systems are inefficient. They supply a quantity of fluid far in excess of the windshield washing requirement. One feature of my system is a simple and inexpensive means to reduce fluid flow without mechanically modifying the pump. This means is accomplished with an economizer bushing 55, FIG. 6. The economizer bushing 55 is placed in the storage container or reservoir 11 on the suction side of the system pump 15. The economizer bushing consists of a threaded portion 63 integral with a frusto-conical section 65. One or more grooves or cuts 61 is provided in the threaded portion 63 whereby a controllable air leak may be introduced in the system. Since all known existing pumping systems on vehicles use positive displacement pumps, the amount of fluid flow is proportionalized by the introduction of an air leak ahead of the pump. The size of the controlled air leak can be easily adjusted to provide the desired amount of fluid flow and at the same time conserving windshield washing fluids.

It can be seen from the foregoing description that when pump 15 is activated, washer fluid in the reservoir 11 flows through conduit 45 and tubular member 49 into the wiper blade passageway 9 whereby a stream of water under pressure is deposited on the windshield surface from the outlet openings 33 in the upper portion of the wiper blade. The washer fluid contacts and flows against the outer surface of the windshield 1 and thereby removes foreign material therefrom. The oscillating motion of wiper 13 produces a wiping action by the windshield contact member 35 of the wiper blade 7 which, in combination with the cleaning action of the washer fluid serves to clean the outer surface of windshield 1.

The foregoing disclosure relates to only one embodiment of the invention which may be modified within the scope of the appended claims.

What I claim is:

1. A wiper blade of elastic material for cleaning of vehicle windshields which comprises:
    (a) a hollow elongated elastic material body,
    (b) a flexible contact member downwardly extending from said body,
    (c) a flexible elongated spline member comprising an elongated generally rectangular upper member and at least one flexible arm member extending downwardly from said rectangular upper member, said rectangular upper member adapted to accept claw means associated with a windshield wiper arm and said spline member internal to and partially filling a fluid passageway in said hollow elongated elastic material body to cooperatively form and maintain said fluid passageway open for flow of fluid therethrough.

2. The wiper blade of claim 1 wherein a pair of flexible arm members extend downwardly from said rectangular member, said arms of generally corrugated configurations such that a lower portion of said arms bear outwardly adjacent to said contact member.

3. The wiper blade of claim 1 wherein said spline member has a radius of curvature resulting in an upward bow flexure of at least about three-eights inch per foot of spline members length.

4. In a windshield cleaning system for cleaning the outer surface of a windshield comprising: an enclosed cleaning fluid supply; wiper means having a pivoted wiper arm for oscillating movement across a windshield surface, said wiper means including a hollow wiper blade of flexible material, said wiper blade having a fluid passageway therethrough, said passageway having outlet openings in its upper end portion for discharging cleaning fluid therefrom; conduit means including pump means to provide cleaning fluid from said supply to said wiper blade whereby said windshield surface is cleaned by the contact of the cleaning fluid and the engagement of the moving wiper blades across the windshield, wherein the improvement comprises said wiper blade having a flexible spline member in said hollow wiper blade, said spline member comprises an elongated generally rectangular upper member and at least one flexible arm member extending downwardly therefrom for biasing said wiper blade along its entire length against the windshield surface and for maintaining said fluid passageway in said hollow wiper blade and wherein said rectangular upper member is adapted to accept claw means associated With a windshield wiper arm.

5. The system of claim 4 wherein a pair of flexible arm members extend downwardly from said rectangular member, said arms of generally corrugated configurations such that a lower portion of said arms bear outwardly on said wiper blade.

6. The system of claim 4 wherein said spline member has a radius of curvature resulting in an upward bow flexure of at least about three-eights inch per foot of spline members length.

7. The system of claim 4 including a means to introduce a controlled air leak on the suction side of the pump means.

8. The system of claim 7 wherein the means introducing the controlled air leak comprises a threaded bushing having one or more grooves in the threaded portion thereof.

* * * * *